No. 826,104. PATENTED JULY 17, 1906.
W. H. HONISS.
HERMETIC CLOSURE GASKET AND ITS MANUFACTURE.
APPLICATION FILED FEB. 29, 1904.
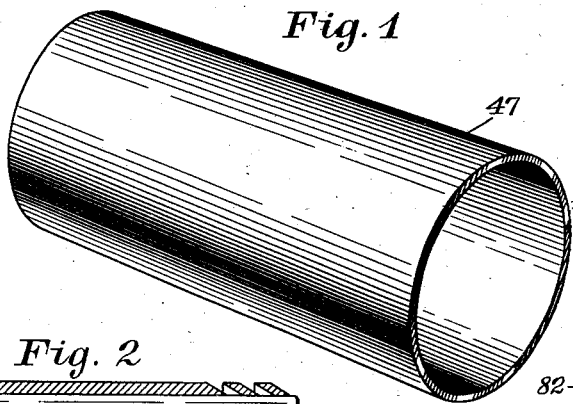
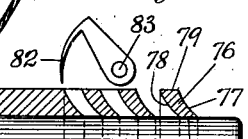
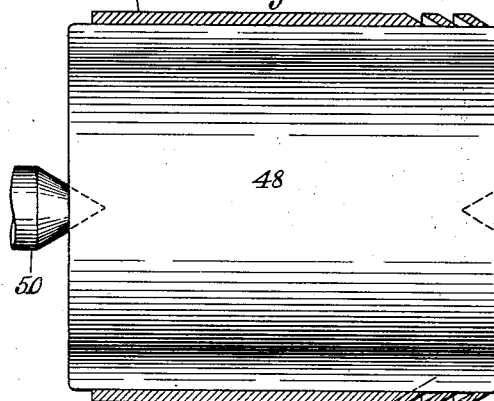
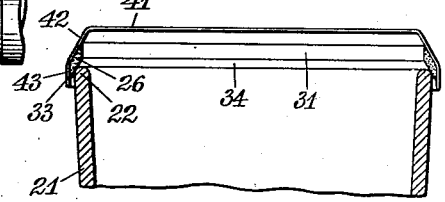
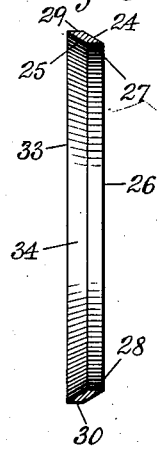
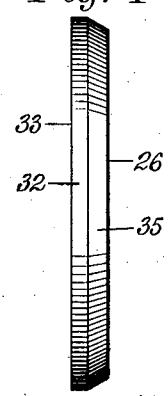
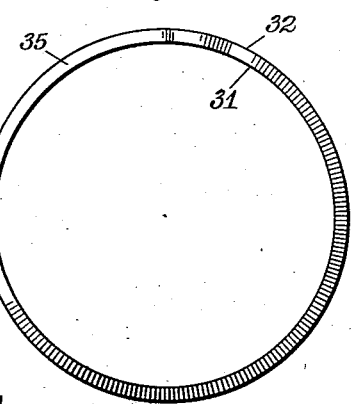
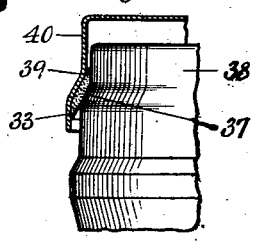
Witnesses:
H. Mallner
Jas. K. Green
Inventor
Wm. H. Honiss

UNITED STATES PATENT OFFICE.

WILLIAM H. HONISS, OF HARTFORD, CONNECTICUT.

HERMETIC-CLOSURE GASKET AND ITS MANUFACTURE.

No. 826,104.　　　Specification of Letters Patent.　　　Patented July 17, 1906.

Application filed February 29, 1904. Serial No. 195,708.

*To all whom it may concern:*

Be it known that I, WILLIAM H. HONISS, a citizen of the United States, and a resident of Hartford, in the county of Hartford and State of Connecticut, have invented certain new and useful Improvements in Hermetic-Closure Gaskets and Their Manufacture, of which the following is a full, clear, and exact specification.

This invention comprises an improved gasket for use in hermetic closures and the improved process for manufacturing those gaskets.

Figure 1 is a perspective view of a tube of elastic material from which these gaskets are cut. Fig. 2 is a plan view of one form of apparatus for performing the process of cutting these improved gaskets from the tube. Fig. 3 is a side view of the finished gasket in section through its longitudinal center. Fig. 4 is a side view, and Fig. 5 a top view, of the finished gasket. Figs. 6 and 7 are fragmentary sectional side views showing the application of these gaskets upon two different forms of receptacles, illustrating its features of advantage, Fig. 6 showing it applied to the sealing of a plain-rimmed tumbler, while Fig. 7 shows it as applied to the sealing of a shouldered jar. Fig. 8 shows a modified form of the gasket and also a modified method of mounting the cutter.

This improved gasket finds its chief utility in connection with what is known as a "wedging-closure," in which the gasket is compressed at an angle against the peripheral edge or shoulder of its seat upon the jar by means of a tapering or flaring cap. The gaskets most commonly used for these wedging-closures are of circular or other compact cross-section. These gaskets are supported prior to the sealing operation just above the shoulder or edge against which they are to be compressed, and it is necessary to deform a gasket of circular cross-section to a considerable extent from its original form in order to carry with certainty a sufficient amount of it across the sealing edge or zone upon which it is to be compressed. Inasmuch as the gasket must rest with comparative looseness upon its seat during the air-exhausting operation it follows that the deforming of the gasket to carry it across its sealing-seat must take place during the sealing operation, which usually must be a very quick operation. Moreover, the sealing operation takes place inside the hermetically-sealed retort beyond the observation of the operator. Hence the safety and certainty of the seal when employing the customary form of gasket depends almost wholly upon the form of the sealing-seat and the cap and upon the manipulative methods employed in the sealing operation.

The improved gasket of this invention is particularly well adapted for use in these wedging-closures, since it is comparatively thick at the middle portion, at which the wedging-pressure is applied, and thin toward the edges where less rubber is required for the sealing operation. One of these thin edges, however, is utilized to project across the sealing-seat while in its initial or air-exhausting operation, thus insuring a safe and certain position of the gasket, as it is originally placed upon the receptacle by the operator, who is thus enabled to observe that the closure is in proper position for the subsequent sealing operation. Moreover, this improved gasket, in addition to its ultimate utility as a closure, is of a form which enables it to be manufactured advantageously from a tube of rubber or other suitable gasket material, as will be hereinafter more fully described.

The form of this improved gasket it shown in detail in Figs. 3, 4, and 5. The cross-section is that of a parallelogram, the parallel inner and outer sides 27 and 29 of which are coincident with the inner and outer cylindrical surface 31 and 32, respectively. The incined line 24 of the cross-section is at an acute angle with the line 27 and is coincident with the exterior conical surface 35 of the gasket, while the line 25 is inclined at an acute angle with the outer line 29 of the cross-section and is coincident with the inner conical surface 34 of the gasket. This gasket when of proper size will when placed upon the receiving-seat of a receptacle centralize and position itself in proper relation to the sealing-seat, so that the thin acute-angled edge 33 will project over and below the sealing-seat by simply placing the gasket and its cap upon the receptacle, as shown in Figs. 6 and 7. In Fig. 6 the edge 33 projects well below the outer edge of the rim 22 of the tumbler 21, bringing the thickest portion of the gasket to the position at which it is wedged against the rim of the gasket by the sealing operation. The thin edges of the gasket above and below the sealing portion thereof constitute safety-margins for the gasket to insure the proper positioning of the thicker central or sealing zone of the gasket, the thinning of these edges effecting a saving of the material of which the gasket is composed not only without sacrificing the efficiency of the gasket, but actually increasing that efficiency. Fig. 7 represents the application of this gasket to a jar 38, having a shouldered sealing-seat 37, which is preferably rounded or chamfered at the zone which is to receive the effective sealing-pressure. The lower thin edge 33 of the gasket projects well over and below that zone, while the upper thin edge 39 extends between the cap 40 and the upper portion of the jar, thereby extending the supporting area of the gasket and the cap in their relation to the jar without having an unnecessary bulk of thickness at its upper end, the thin end permitting the cap to fit more closely against the upper portion of the jar. This form of gasket by disposing the material in the most advantageous manner effects an economy in the use of the rubber of which the gasket is made by reducing the cost of the material required for a given number of gaskets. Gaskets of circular cross-section are commonly made by extrusion processes, the unvulcanized rubber being forced through an opening of the required size, thus producing a continuous strip of the required cross-section. These strips are afterward cut up into proper lengths, the ends of which are scarfed and cemented together to form the rings before being vulcanized. These processes are slow and expensive and lead to irregularities in size and imperfections in the joining. As compared with these gaskets of circular, square, or other compact form commonly employed for wedging-closures the gaskets of the present invention are less expensive, requiring less room on the ordinary shouldered sealing-seat, may be used for plain-rimmed tumblers having no receiving-seat, and require less pressure and less movement to deform and compress them during the sealing operation.

This improved gasket may be made by extrusion, as above described, or in other well-known ways; but it is preferably cut from a tube of the appropriate size made from rubber or other suitable material, since this method is more economical than the others.

Fig. 2 illustrates one of the ways of carrying out the process of cutting this gasket from a rubber tube. The tube 47 is made approximately of the same inner and outer diameters as the desired diameters of the inner and outer cylindrical surfaces 31 and 32 of the finished gasket. The tube is mounted for rotation upon an axis coincident with its longitudinal center—as, for example, upon the mandrel 48, turning upon the centers 50. The tube may be stretched over the mandrel or cemented thereto in any desired or convenient way. The cutter 49 is mounted to engage the tube 47 at suitable intervals along the length of the latter, these intervals being determined by the desired length of the cylindrical portions of the gasket. The cutter is fed toward the axis of the mandrel at the same angle to that axis as the desired angle for the overhanging edge 33 of the finished gasket and is moved along the mandrel or the mandrel is moved longitudinally past the cutter after each operation of the cutter.

In Fig. 8 is shown a modified form of gasket and a modified form of apparatus for cutting that gasket from tubing. The inclined surfaces 77 and 78 of the gasket 76 are curved instead of being straight inclines. As indicated by this figure, it is not essential that these inclined sides shall be straight or that they shall be parallel with each other. In the apparatus shown in Fig. 8 the cutter 82 is pivotally mounted at 83, being swung upon that pivot in the cutting operation. The blade 82 should be curved in substantial conformity with an arc struck from the pivotal center 83. In this apparatus, as in that shown in Fig. 2, the cutter 82 may be moved longitudinally after each cut along the tube 47, whose thickness extends from 79 to 80, or the tube may be advanced longitudinally past the cutter after each cutting stroke and while the cutter is in its outer position. (Shown in Fig. 8.)

I claim as my invention—

1. The process of making acute-angled ring gaskets from a tube of gasket material, which consists in rotating the tube upon its longitudinal center as an axis, and cutting the rings therefrom by traversing a cutting-tool through the wall of the rotating tube at the desired intervals, and at an acute angle with the said axis.

2. The process of making acute-angled ring gaskets, which consists in separating each gasket from a tube of gasket material by means of a circumferential cut penetrating the wall of the tube at an acute angle to the longitudinal center of the tube.

3. A ring gasket made of rubber or similar elastic material, and having cylindrical inner and outer faces, with the adjacent edges forming acute angles with the respective inner and outer faces.

4. An annular gasket, made of rubber or similar elastic material in the form of a short cylinder, having oblique upper and lower surfaces substantially parallel with each other.

5. A gasket for hermetically-sealed receptacles made of rubber or similar elastic material, having an approximately rhombic or rhomboidal cross-section, the inner and outer faces of which are substantially cylindrical.

In testimony whereof I have signed my name to this specification in the presence of two subscribing witnesses.

WM. H. HONISS.

Witnesses:
WILLIAM A. LORENZ,
NELLIE PHOENIX.